(12) United States Patent
Tang et al.

(10) Patent No.: US 7,544,626 B2
(45) Date of Patent: Jun. 9, 2009

(54) PREPARATION OF SELF-ASSEMBLED SILICON NANOTUBES BY HYDROTHERMAL METHOD

(75) Inventors: Yuanhong Tang, Changsha (CN); Lizhai Pei, Changsha (CN); Yangwen Chen, Changsha (CN); Chi Guo, Changsha (CN)

(73) Assignee: Hunan University (CN)

( * ) Notice: Subject to any disclaimer, the term of this patent is extended or adjusted under 35 U.S.C. 154(b) by 473 days.

(21) Appl. No.: 10/578,450

(22) PCT Filed: May 8, 2005

(86) PCT No.: PCT/CN2005/000630

§ 371 (c)(1),
(2), (4) Date: May 5, 2006

(87) PCT Pub. No.: WO2005/108288

PCT Pub. Date: Nov. 17, 2005

(65) Prior Publication Data

US 2007/0077680 A1  Apr. 5, 2007

(30) Foreign Application Priority Data

May 11, 2004  (CN)  .................... 2004 1 0023180
Jul. 6, 2004  (CN)  .................... 2004 1 0063033

(51) Int. Cl.
*H01L 21/00* (2006.01)
(52) U.S. Cl. .................... 438/800; 977/743; 977/840
(58) Field of Classification Search .................. 977/734, 977/743, 848, 855, 883, 938; 438/800
See application file for complete search history.

(56) References Cited

U.S. PATENT DOCUMENTS 6,656,573 B2 * 12/2003 Chen et al. ............... 428/195.1

(Continued)

FOREIGN PATENT DOCUMENTS

CN  1482207 A  12/1999

(Continued)

OTHER PUBLICATIONS

Li, Mengke et al., Preparation of well-aligned carbon nanotubes/silicon nanwires composite structure arrays, Science in China (Series B), 2002, 32 (3): 204-209 (also titled Preparation of Orientation Carbon Nanotube/Silicon nanowire Complex Array, in English abstract).

(Continued)

*Primary Examiner*—David Vu
*Assistant Examiner*—Brandon Fox
(74) *Attorney, Agent, or Firm*—Knobbe, Martens, Olson & Bear, LLP

(57) ABSTRACT

The present invention relates to a method for preparing self-assembled silicon nanotubes (SiNTs) by a hydrothermal method. A method for preparing self-assembled SiNTs comprises forming a mixture of silicon oxide and water in a sealed container, wherein the mixture has a silicon oxide to water ratio of no more than 10% by weight. The mixture is maintained at a constant temperature and a constant pressure, and the mixture is stirred for a period of time. Self-assembled SiNTs may be formed with an average inner diameter of less than 5 nm and an average outer diameter of around 15 nm. The present invention completely utilizes non-toxic raw materials, and the materials and process do not pollute the environment, so the method satisfies the development trends of the modern industry.

9 Claims, 3 Drawing Sheets

U.S. PATENT DOCUMENTS

| | | | |
|---|---|---|---|
| 7,132,126 B2 * | 11/2006 | Lee et al. | 427/220 |
| 2002/0175408 A1 * | 11/2002 | Majumdar et al. | 257/734 |
| 2003/0119920 A1 * | 6/2003 | Wang et al. | 518/715 |
| 2004/0175844 A1 * | 9/2004 | Yang et al. | 438/2 |
| 2005/0036939 A1 * | 2/2005 | Wong et al. | 423/598 |

FOREIGN PATENT DOCUMENTS

| | | |
|---|---|---|
| CN | 1454841 A | 11/2003 |
| CN | 1474434 A | 2/2004 |
| JP | 11-349321 A | 12/1999 |

OTHER PUBLICATIONS

Zhou, Guangwen et al., Synthesis and micro-structural study of one-dimensional nano-materials, Science in China (Series A), 1999, 29 (I): 85-91 (also titled Synthesis of One-dimensional Nano Material and Its Microstructure, in English abstract).

Sha, Jian et al., Silicon Nanotubes, Advanced Materials, 2002, 14(17): 1219-1221+1179.

Tang, Y.H. et al., Self-Assembled Silicon Nanotubes under Supercritically Hydrothermal Conditions, PRL 95, 116102 (2005).

Jeong, Seung Yol et al., Synthesis of Silicon Nanotubes on Porous Alumina Using Molecular Beam Epitaxy, Advanced Materials, 2003, 15(14): 1172-1176.

Charlier, Jean-Christophe, Microscopic Growth Mechanisms for Carbon Nanotubes, Science, 275: 646-649 Jan. 31, 1997.

International Search Report mailed Sep. 15, 2006 in PCT/CN2005/000630.

* cited by examiner

PREPARATION OF SELF-ASSEMBLED SILICON NANOTUBES BY HYDROTHERMAL METHOD

CROSS-REFERENCE TO RELATED APPLICATIONS

This Application is a U.S. National Phase of the International Application No. PCT/CN05/000630 filed May 8, 2005 designating the U.S. and published on Nov. 17, 2005 as WO 05/108288, which claims priority to Chinese Patent Application No. 200410023180.1, filed May 11, 2004 and Chinese Patent Application No. 200410063033.7, filed Jul. 6, 2004.

BACKGROUND OF THE INVENTION

1. Field of the Invention

The present invention is related to a method for the preparation of self-assembled silicon nanotubes (SiNTs), in particular, to a method for the synthesis of self-assembled SiNTs from inorganic solution (hydrothermal solution).

2. Description of the Related Art

Although the difficulty in the synthesis of SiNTs is widely attributed to the $sp^3$ hybridization in silicon, the possibility of the existence of SiNTs has been suggested theoretically. The preparation of SiNTs, especially self-assembled SiNTs is still very challenging at present. Great interest has focused on carbon nanotubes (CNTs) owing to their excellent properties, and many researchers in the world are attempting to prepare self-assembled SiNTs. Recently SiNTs were prepared using a template method respectively by Jeong and his coworkers in Sungkyunkwan University, and Sha and his coworkers in Zhejiang University. The corresponding research results were published in Advanced Materials (Adv Mater), which is a famous international journal in the field of materials.

SiNTs with an outer diameter of less than 100 nm were synthesized by Jeong and his coworkers using alumina templates. The templates were brought into a molecular beam epitaxy (MBE) chamber where the chamber was evacuated to a pressure of $5 \times 10^{-10}$ Torr. The Si atoms/clusters were sputtered for 10 min by an electron-beam evaporator. The temperature of alumina templates was maintained at 400° C. After the deposition, the sample was further heat treated at 600° C. or 750° C. under ambient conditions for oxidation.

SiNTs with an outer diameter of less than 100 nm were also fabricated by Sha and his coworkers using a nanochannel $Al_2O_3$ (NCA), silane as the silicon source and gold as the catalyst at 620° C. and 1450 Pa by a chemical vapor deposition (CVD) process.

Although SiNTs have been prepared by the alumina template and NCA, the SiNTs were formed in the inner wall of templates by aggregation and not by self-assembled growth of the elemental Si. Therefore SiNTs obtained by the templates are not really self-assembled SiNTs.

SUMMARY OF THE INVENTION

One objective of the invention is to prepare self-assembled SiNTs from silicon source materials without metallic catalysts and templates. This method has many advantages including simple process, easy to operate and control the equipment, low cost and no pollution. In addition, a hydrothermal method may be used to prepare self-assembled SiNTs with small diameter and uniform diameter distribution.

One embodiment provides a method for preparing self-assembled SiNTs comprising forming a mixture of silicon oxide and water, wherein the mixture has a silicon oxide to water ratio of 0.01% to 10% by weight. The mixture is maintained at a temperature of about 200° C. to about 500° C. and a pressure of about 3 MPa to about 40 MPa for 1 to 5 hours while stirring.

Another embodiment provides a self-assembled silicon nanotube comprising a tubular body having a crystalline silicon wall layer having a thickness of about 5 nm or less and defining an inner pore diameter of about 5 nm or less. The tubular body has an outer amorphous silica layer having a thickness of less than 2 nm. The tubular body has closed ends and an outer diameter in the range of about 8 to 20 nm.

DETAILED DESCRIPTION OF THE PREFERRED EMBODIMENTS

Figure 1:
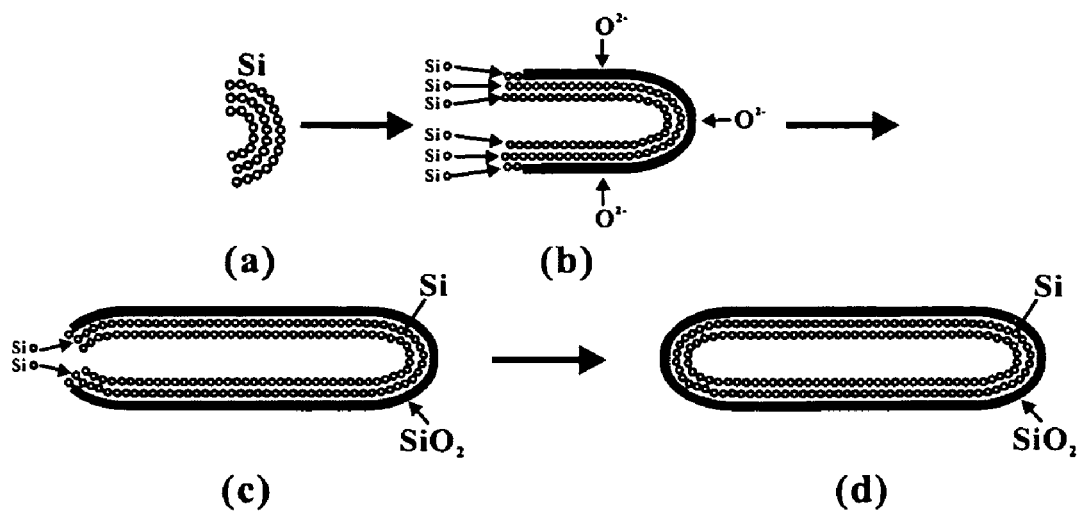
FIG. 1 is a self-assembled growth schematic of the self-assembled SiNTs.

The preparation of self-assembled SiNTs can be performed by the following process. Silicon oxide is mixed with water (e.g., a solvent) to form a mixture with a silicon oxide to water ratio of 0.01% to 10% by weight. Once the silicon oxide and water are mixed, the mixture is put into a sealed reaction kettle or container. The reaction container is maintained under the condition of about 200-500° C. and about 3-40 MPa of pressure for 1-5 hours with substantially uniform stirring. The mixture may be stirred using a magnetic stirrer. In one embodiment, the ratio of silicon oxide to water is preferably 0.05% to 8% by weight, and more preferably 0.1% to 6% by weight.

In another embodiment, the self-assembled SiNTs can be prepared under conditions with a temperature of 250° C. to 500° C. and a pressure of 8 MPa to 35 MPa for 1-4 hours with substantially uniform stirring. In a more preferred embodiment, the self-assembled SiNTs can be prepared under conditions with a temperature of 300° C. to 450° C. and a pressure of 10 MPa to 30 MPa for 1-3 hours with substantially uniform stirring. In another more preferred embodiment, the self-assembled SiNTs can be prepared under conditions with a temperature of 300° C. to 400° C. and a pressure of 6 MPa to 10 MPa for 3-4 hours with substantially uniform stirring.

No metallic catalysts and templates are used in the preparation of SiNTs using the hydrothermal method disclosed in the present invention. The SiNTs prepared by the hydrothermal method of the present invention are identified as a kind of self-assembled SiNTs according to the results of characterization. The common problems of nanoscale materials, including the ease of congregation and the difficulty of dispersion, are solved because the self-assembled SiNTs are obtained from water where no congregation occurs. At the same time, the self-assembled SiNTs makes it possible to increase the strength and toughness of composites due to the ability of forming SiNTs with larger length to diameter ratios. Many researchers have shown that silicon nanowires (SiNWs) have great potential for practical applications due to the typical quantum confinement effect and excellent physical properties. Theoretical studies have shown that SiNTs can take advantage of the quantum confinement effect more easily and can be more stable than SiNWs. Therefore, SiNTs are predicted to be a promising nanoscale material for potential applications in the nanotechnology field, which provides a new approach for making nanodevices that are highly integrated and miniaturized.

The method of the present invention operates simply and easily. Since simple equipment is used, the low cost can provide the opportunity for practical applications of the self-assembled SiNTs. The starting materials and the process do not pollute the environment, and therefore large quantities of self-assembled SiNTs can be prepared industrially in accordance with the development trend of modern industry for environmental protection.

The growth mechanism of the self-assembled SiNTs prepared by the method of present invention is proposed based on the "lip-lip" interaction growth model by Charlier et al. During the growth phase of the nanotubes, chemical bonding at the end of nanotubes (NTs) is in a metastable energy minimum, which prevents the closure of the growth end of NTs. The atoms connect with each other continuously resulting in the sustained growth of NTs. With the change of conditions, such as the decrease of temperature, the chemical bonding of the growing NTs approaches a more stable state. Since the closed structure is more stable than the open state, it results in the closure of the growth end of NTs.

FIG. 1 is a schematic of the growth process of self-assembled SiNTs. Chemical bonding between atoms are all in a metastable state and abundant $H^+$, Si atoms and $O^{2-}$ atoms are formed due to the high temperature and high pressure of the hydrothermal condition and the reactive nature of the Si and silicon oxide in gaseous form. Nucleation starts relatively uniformly from the vapor substances in the reaction kettle because of the stirring. Then the temperature rises rapidly in the kettle due to the exothermic process, which suggests that the growth process of the SiNTs has taken place. There is a temperature gradient inside the reaction container, i.e. the temperature goes from high in the center of the reaction kettle to low at the edge of the reaction kettle. The tubular structures are initially formed in the low temperature area where the Si and Si connect during the growth of SiNTs (FIG. 1(a)). The Si—Si bonding at the growth edge of the tubular structures in a metastable energy minimum prevents the closure of the growth edge of SiNTs. At the same time, the possibility of collision with different atoms increases because SiNTs move continually between low temperature areas and high temperature areas with stirring. Thus abundant Si atoms in high temperature areas enter into the tubular walls of SiNTs and are combined with Si in the tubular wall resulting in the one-dimensional growth of SiNTs along the temperature gradient.

A stable $SiO_2$ layer is formed when the Si atoms at the interface of the tube wall and the atomic $O_2$— in the environment react with each other, therefore preventing the growth of SiNTs in non-one-dimensional direction (FIG. 1(b)). Abundant $H^+$ in the hydrothermal condition may cause one of four Si atoms in the crystalline Si to be substituted by $H^+$ and possibly cause a part of Si in the tubular wall of SiNTs to become amorphous Si. The possible result is the formation of a tubular wall that is similar to a graphite layer structure.

Once the heating of the reaction kettle has been stopped, Si—Si bonding at the growth end of SiNTs is changed gradually from the metastable state to a more stable state due to the falling of temperature and pressure. At the same time, the temperature gradient in the kettle also slowly disappears, resulting in the closure of the growth end and the growth of SiNTs stops (FIGS. 1(c), (d)).

Figure 2:
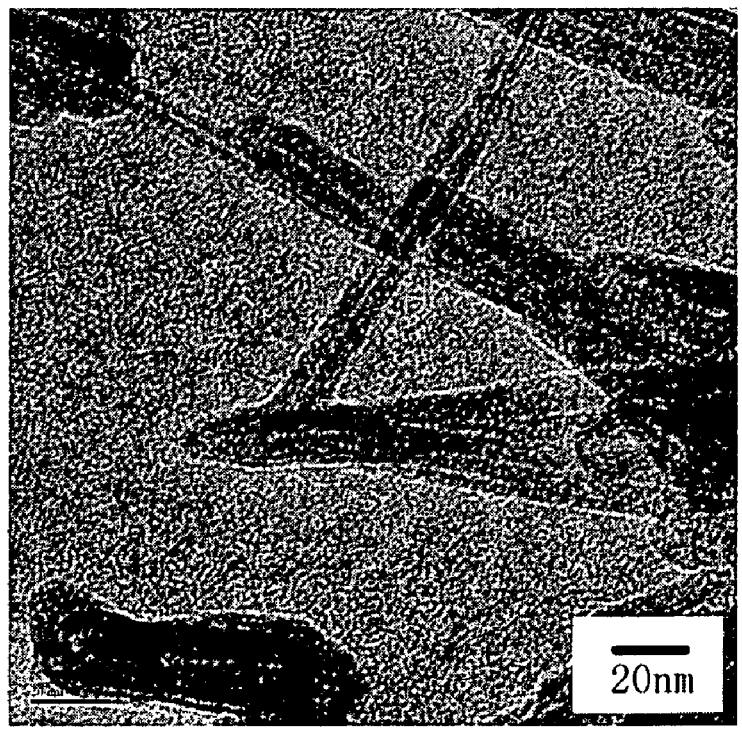
FIG. 2 is a transmission electron microscopy (TEM) image of the self-assembled SiNTs prepared in accordance with one embodiment of the invention.

The TEM image of the self-assembled SiNTs in FIG. 2 shows that an abundance of nanotubes were formed using the hydrothermal method. Most nanotubes are straight in shape and the surfaces of self-assembled SiNTs are smooth. The outer diameter is usually less than 5 nm, the distribution range is about 8-20 nm, and the lengths of SiNTs are several hundreds of nanometers to microns. The diameter of the inner pore (e.g., inner diameter) is smaller than 5 nm in general with a small diameter distribution range. The growth tips of the self-assembled SiNTs are in closed semicircular form showing that no catalyst particles exist in the SiNTs and no growth tips with open end structure are observed.

Figure 3:
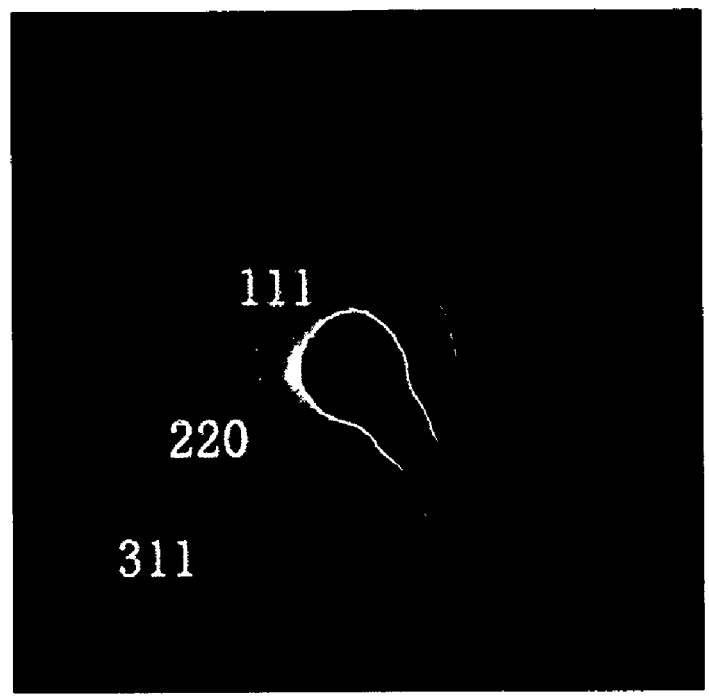
FIG. 3 is a selected area electron diffraction (SAED) image of the self-assembled SiNTs prepared in accordance with one embodiment of the invention.

The self-assembled SiNTs are mostly poly-crystalline structures according to the SAED pattern (FIG. 3). The SAED patterns; of the first, second, and third order diffraction rings, from the inside to the outside of a nanotube, match well with the (1 1 1), (2 2 0) and (3 1 1) diffraction crystal planes, respectively.

Figure 4:
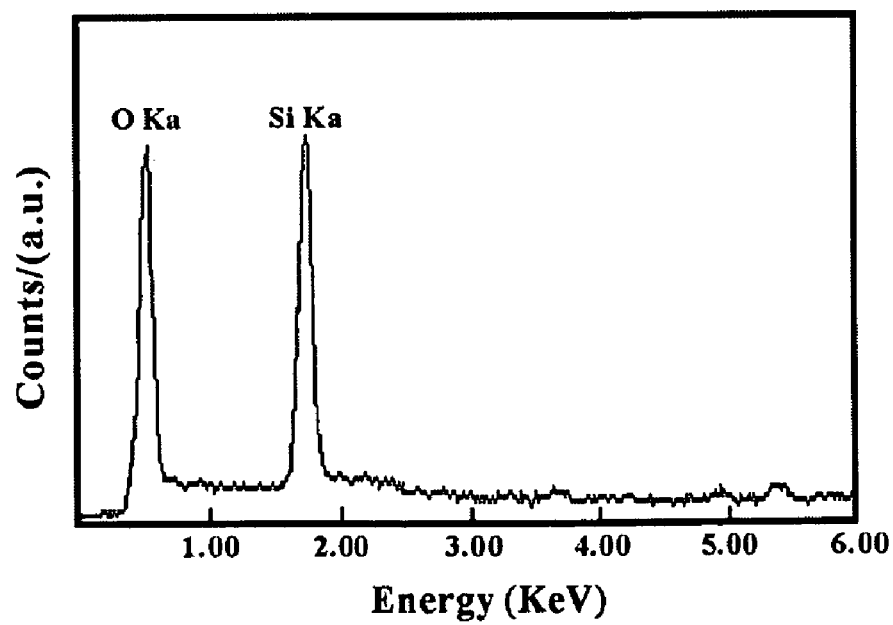
FIG. 4 is the energy dispersive X-ray spectroscopy (EDS) of the self-assembled SiNTs prepared in accordance with one embodiment of the invention.

The EDS analysis in FIG. 4 shows that the chemical composition of the products consists of Si and O. The equal peak height of Si and O suggests that the atomic ratio of Si and O is 1:1, which is consistent with that of silicon monoxide.

Figure 5:
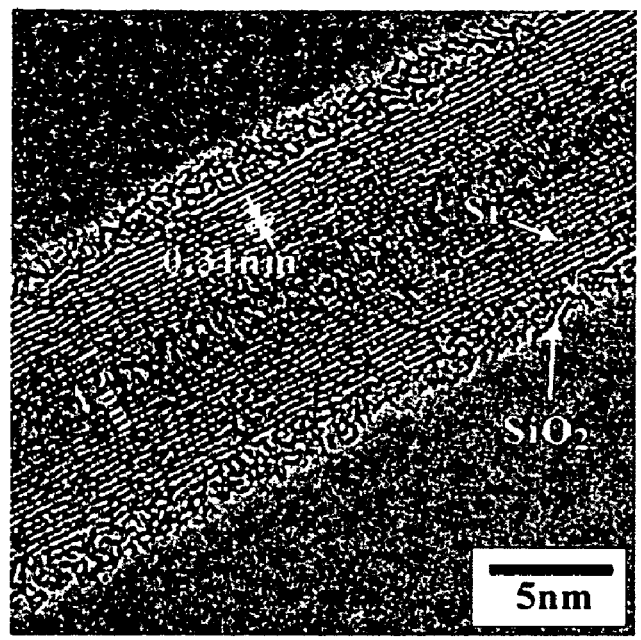
FIG. 5 is a high-resolution transmission electron microscopy (HRTEM) image of a tubular body of the self-assembled SiNTs prepared in accordance with one embodiment of the invention.
Figure 6:
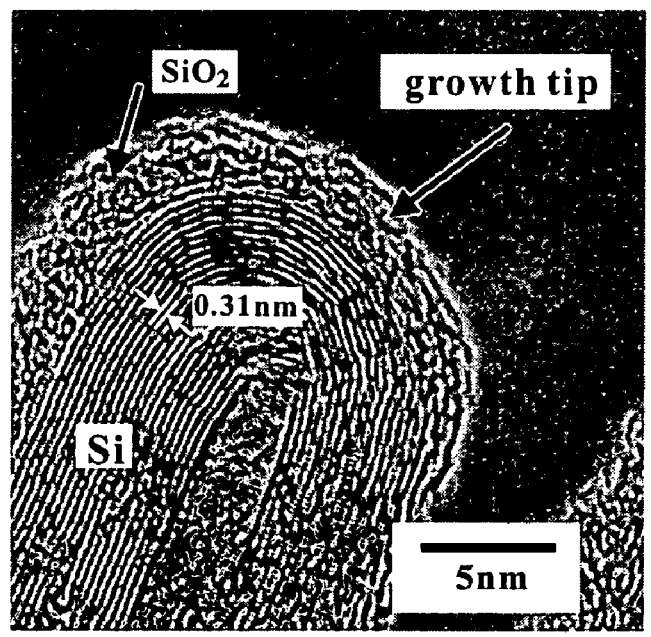
FIG. 6 is a HRTEM image of a tubular growth tip of the self-assembled SiNTs prepared in accordance with one embodiment of the invention.

The interplanar spacing, outer and inner diameters, the thicknesses of amorphous outer layer and Si wall layer of SiNTs were measured HRTEM and calculated using a software by Digital Micrograph applied in the HRTEM. The hollow inner pore, crystalline silicon wall layer and amorphous silica outer layer can be clearly observed in the HRTEM images. The crystalline layer grows along the axial direction of SiNTs. The interplanar spacing of crystalline in the SiNTs is around 0.31 nm according to the measurement and the calculation, which agrees with the {111} plane of silicon. The outer diameter of the tubular body in FIG. 5 is about 14 nm, the diameter of inner pore is about 5 nm and the thicknesses of crystalline Si and amorphous outer layer are about 5 nm and less than 2 nm, respectively. The outer diameter of the tubular growth tip in FIG. 6 is about 18 nm and the diameter of inner pore is about 3 nm. The inner diameter of the growth tip is larger than that of the tubular body. The corresponding Si wall thickness is 5 nm and the amorphous outer layer thickness less than 2 nm.

The amorphous silicon oxide outer layer at the growth tip of the self-assembled SiNTs does not distribute evenly and some defects exist The environment in the reaction kettle is an oxidation environment, and there are two elements Si and O in the products (e.g., SiNTs). Since silicon oxide is the most stable compound of silica, the outer layers of the SiNTs can be identified as amorphous silica. The appearance of the same number of lattice fringes and amorphous silica outer layers on both sides of a self-assembled SiNTs shows that it has a seamless tubular structure. Therefore, the structures of SiNTs are composed of three parts: hollow inner pore with a diameter of several nanometers in the middle, crystalline silicon wall layers with a thickness of less than 5 nm and amorphous silica outer layers with less than 2 nm thickness.

EXAMPLE 1

Silicon oxide and water were mixed together to form a mixture of 0.01% by weight, and the mixture was place in a sealed reaction kettle. The mixture was maintained at 200° C. under 3 MPa pressure for 1 hour with substantially uniform stirring using a magnetic stirrer. Self-assembled SiNTs with an average inner diameter of less than 5 nm and an average outer diameter of around 15 nm were formed.

EXAMPLE 2

Silicon oxide and water were mixed together to form a mixture of 0.1% by weight, and the mixture was place in a sealed reaction kettle. The mixture was maintained at 380° C. under 8 MPa pressure for 1 hour with substantially uniform stirring using a magnetic stirrer. Self-assembled SiNTs with an average inner diameter of less than 5 nm and an average outer diameter of around 15 nm were formed.

EXAMPLE 3

Silicon oxide and water were mixed together to form a mixture of 0.5% by weight, and the mixture was place in a sealed reaction kettle. The mixture was maintained at 500° C. under 8 MPa pressure for 1 hour with substantially uniform stirring using a magnetic stirrer. Self-assembled SiNTs with an average inner diameter of less than 5 nm and an average outer diameter of around 15 mm were formed.

EXAMPLE 4

Silicon oxide and water were mixed together to form a mixture of 1% by weight, and the mixture was place in a sealed reaction kettle. The mixture was maintained at 300° C. under 10 MPa pressure for 3 hours with substantially uniform stirring using a magnetic stirrer. Self-assembled SiNTs with an average inner diameter of less than 5 nm and an average outer diameter of around 15 nm were formed.

EXAMPLE 5

Silicon oxide and water were mixed together to form a mixture of 4% by weight, and the mixture was place in a sealed reaction kettle. The mixture was maintained at 380° C. under 15 MPa pressure for 1 hour with substantially uniform stirring using a magnetic stirrer. Self-assembled SiNTs with an average inner diameter of less than 5 nm and an average outer diameter of around 15 nm were formed.

EXAMPLE 6

Silicon oxide and water were mixed together to form a mixture of 6% by weight, and the mixture was place in a sealed reaction kettle. The mixture was maintained at 500° C. under 20 MPa pressure for 1 hour with substantially uniform stirring using a magnetic stirrer. Self-assembled SiNTs with an average inner diameter of less than 5 nm and an average outer diameter of around 15 nm were formed.

EXAMPLE 7

Silicon oxide and water were mixed together to form a mixture of 6% by weight, and the mixture was place in a sealed reaction kettle. The mixture was maintained at 380° C. under 8 MPa pressure for 3 hours with substantially uniform stirring using a magnetic stirrer. Self-assembled SiNTs with an average inner diameter of less than 5 nm and an average outer diameter of around 15 nm were formed.

EXAMPLE 8

Silicon oxide and water were mixed together to form a mixture of 8% by weight, and the mixture was place in a sealed reaction kettle. The mixture was maintained at 500° C. under 30 MPa pressure for 2 hours with substantially uniform stirring using a magnetic stirrer. Self-assembled SiNTs with an average inner diameter of less than 5 nm and an average outer diameter of around 15 nm were formed.

EXAMPLE 9

Silicon oxide and water were mixed together to form a mixture of 10% by weight, and the mixture was place in a sealed reaction kettle. The mixture was maintained at 500° C. under 30 MPa pressure for 4 hours with substantially uniform stirring using a magnetic stirrer. Self-assembled SiNTs with an average inner diameter of less than 5 nm and an average outer diameter of around 15 nm were formed.

EXAMPLE 10

Silicon oxide and water were mixed together to form a mixture of 8% by weight, and the mixture was place in a sealed reaction kettle. The mixture was maintained at 450° C. under 30 MPa pressure for 3 hours with substantially uniform stirring using a magnetic stirrer. Self-assembled SiNTs with an average inner diameter of less than 5 nm and an average outer diameter of around 15 nm were formed.

We claim:

1. A method for preparing self-assembled silicon nanotubes (SiNTs) comprising:
   forming a mixture of silicon oxide and water, wherein said mixture has a silicon oxide to water ratio of 0.01 to 10% by weight; and
   maintaining said mixture at a temperature of about 200° C. to about 500° C. and a pressure of about 3 MPa to about 40 MPa for 1 to 5 hours while stirring.

2. The method of claim 1 further comprises placing said mixture in a sealed reaction kettle.

3. The method of claim 1, wherein the said mixture has a silicon oxide to water ratio of 0.05% to 8% by weight.

4. The method of claim 1, wherein the said mixture has a silicon oxide to water ratio of 0.1% to 6% by weight.

5. The method of claim 1, wherein said temperature and pressure are maintained at about 250° C. to about 500° C. and about 8 MPa to about 35 MPa for 1 to 4 hours while stirring.

6. The method of claim 1, wherein said temperature and pressure are maintained at about 300° C. to about 450° C. and about 10 MPa to about 30 MPa for 1 to 3 hours while stirring.

7. The method of claim 1, wherein said temperature and pressure are maintained at about 300° C. to about 400° C. and about 6 MPa to about 10 MPa for 2 to 4 hours while stirring.

8. The method of claim 1, wherein said mixture is stirred uniformly by a magnetic stirrer.

9. A silicon nanotube prepared according to the method of claim 1.

* * * * *